United States Patent [19]
Glatzmeier et al.

[11] Patent Number: 5,782,549
[45] Date of Patent: Jul. 21, 1998

[54] OPERATIONS VEHICLE WITH A LIGHTING DEVICE

[75] Inventors: Alfred Glatzmeier, Linz; Franz Hochdaninger, Lauffen, both of Austria

[73] Assignee: Rosenbauer International Aktiengesellschaft, Leonding, Austria

[21] Appl. No.: 737,955

[22] PCT Filed: May 29, 1995

[86] PCT No.: PCT/AT95/00106

§ 371 Date: Nov. 27, 1996

§ 102(e) Date: Nov. 27, 1996

[87] PCT Pub. No.: WO95/32875

PCT Pub. Date: Dec. 7, 1995

[30] Foreign Application Priority Data

May 30, 1994 [AT] Austria ................. A 1105/94

[51] Int. Cl.$^6$ ................................................. B60Q 3/00
[52] U.S. Cl. ................... 362/80; 362/74; 340/472
[58] Field of Search ............................ 362/74, 80, 61, 362/83.3; 340/468, 470, 471, 472

[56] References Cited

U.S. PATENT DOCUMENTS

| | | | |
|---|---|---|---|
| 3,728,537 | 4/1973 | Barenyi | 362/74 |
| 3,891,266 | 6/1975 | Wilfert et al. | 362/74 |
| 4,947,293 | 8/1990 | Johnson et al. | 362/74 |
| 5,483,427 | 1/1996 | Dealey, Jr. et al. | 362/74 |

FOREIGN PATENT DOCUMENTS 0 365 937 B1  5/1990  European Pat. Off. .

OTHER PUBLICATIONS

EPO Search Report dated Oct. 6, 1995.

*Primary Examiner*—Thomas M. Sember
*Attorney, Agent, or Firm*—Ratner & Prestia

[57] ABSTRACT

An operations vehicle with a lighting device for a working area extending from a side panel, a roof, or both, at least in the direction opposite the operations vehicle. The lighting device is arranged in the transition region between the side panel and the roof of the operations vehicle. In the transition region at least between a side panel and the roof of an operations vehicle is arranged a dropside-like boundary element which is placed on the roof and projects beyond it in a more or less perpendicular direction. On the boundary element is arranged a light source, in particular a fluorescent tube, in a lining which in the direction of the side panel of the operations vehicle and if occasion arises in the direction pointing away from it comprises openings for passage of light, preferably sealed by a light-transmitting lining panel.

29 Claims, 4 Drawing Sheets

OPERATIONS VEHICLE WITH A LIGHTING DEVICE

This application is the U.S. national-phase application of PCT International Application No. PCT/AT95/00106.

BACKGROUND OF THE INVENTION

1. Field Of The Invention

The invention concerns an operations vehicle with a lighting device.

2. Description Of The Related Art

Operations vehicles with lighting devices are already known. Often such operations vehicles use a telescopically extendable mast which is arranged inside the vehicle. One or more spotlights are arranged at the upper end of the mast for illuminating the area surrounding the operations vehicle. The disadvantage with such arrangements is that these light sources must be raised to a great height above the location of operations to allow illumination of the working area with wide coverage. In addition, the light sources often dazzle or blind the crews engaged. The light sources are sometimes arranged in the transition region between the side panels and the roof of the operations vehicle, in particular fluorescent tubes are arranged in their own holding chambers above the appliance compartments, but usually the stowage space in the equipment cabins of such operations vehicles is disadvantageously reduced as a result.

An operations vehicle is also already known—according to EP-BI-O 365 937—in which lighting devices are arranged in the region of the side panels. These lighting devices are arranged on flaps which are located in the upper side region of the side panels. These flaps can be pivoted up by their own displacement drive mechanisms out of a position aligned with the side panel into a position projecting beyond it, wherein the lighting units are arranged on the side of the flap facing towards the vehicle body for receiving the equipment and (typically) fire extinguishing apparatus. As a result, the lighting devices are located inside the vehicle body when the flaps are in the folded-in position aligned with the side panel, while in the swung-out state they illuminate the working area in the region of removal from the vehicle body or in front of it. The construction of these lighting devices requires a large number of component parts, and damage to the lighting devices, especially in the usually hectic operations event, occurs frequently because the flaps project beyond the side panels.

In view of the shortcomings of the conventional operations vehicles, it is an object of the present invention to illuminate the working zone around an operations vehicle with as little blinding or dazzling as possible Another object is to facilitate the removal of equipment or appliances from the operations vehicle.

SUMMARY OF THE INVENTION

These and other objects are achieved by the present invention. One advantage of the present invention is that, due to the use of a dropside-like boundary element, the roof space usually needed to store tools or operations equipment can be limited and the stowage space in the equipment cabin of such an operations vehicle is not reduced by the additional arrangement of the lighting devices for the surrounding area. Rigid installation of the light sources also makes additional extension of a lighting mast or swinging out of flaps superfluous. At the same time it is therefore possible to allow uniform, almost shadow-free illumination in both side regions of the vehicle, so that any other lighting devices carried, such as a lighting mast integrated in the operations vehicle, can be used to illuminate the actual location of operations or the object of the fire or the like. The essential advantage of this design is that the risk of an accident due to stumbling or falling when approaching the operations vehicle and when walking away from the operations vehicle in the direction of the location of operations is reduced, and at the same time removal of the equipment or extinguishing apparatus from the operations vehicle is facilitated. Another advantage is that illumination of the roof surface of the operations vehicle is also achieved for the removal of operations equipment as well as for walking on it without danger.

Another advantage of the present invention is the use of dazzle-free fluorescent tubes as the light source. Such light sources prevent dazzling or blinding of the crews engaged, in particular when approaching the operations vehicle or when removing equipment or extinguishing apparatus.

Still another advantage of the present invention is that the light source is protected against entry of moisture and can vary the light scatter and lighting intensity of the light given off over the length of the vehicle.

Yet another advantage of the present invention is that, in the case of equipment cabins which are made in self-supporting or cantilever design, the boundary element can simultaneously be used to reinforce the corner junction between the roof and the side panel.

Also advantageous is a variation of the present invention which illuminates, almost without extra expenditure, both the region in front of the side panels of the operations vehicle and the roof surface, that is, the roof region on which additional tools and items of equipment are usually mounted. Therefore, sources of accidents can be eliminated.

The present invention also allows control of the respective illumination or the degree of brightness in the different regions of the operations vehicle.

Other advantageous embodiments of the present invention seal the roller shutter or water drainage into the boundary element and facilitate arrangement of the connecting elements in the junction region. Added to this is the fact that, due to the arrangement of these additional components, spatial reinforcement of the boundary element can be obtained without extra expenditure, but with extra benefit.

BRIEF DESCRIPTION OF THE DRAWING

The invention is described in more detail below with the aid of the practical examples shown in the drawings, in which.

DETAILED DESCRIPTION OF THE INVENTION

Figure 1:
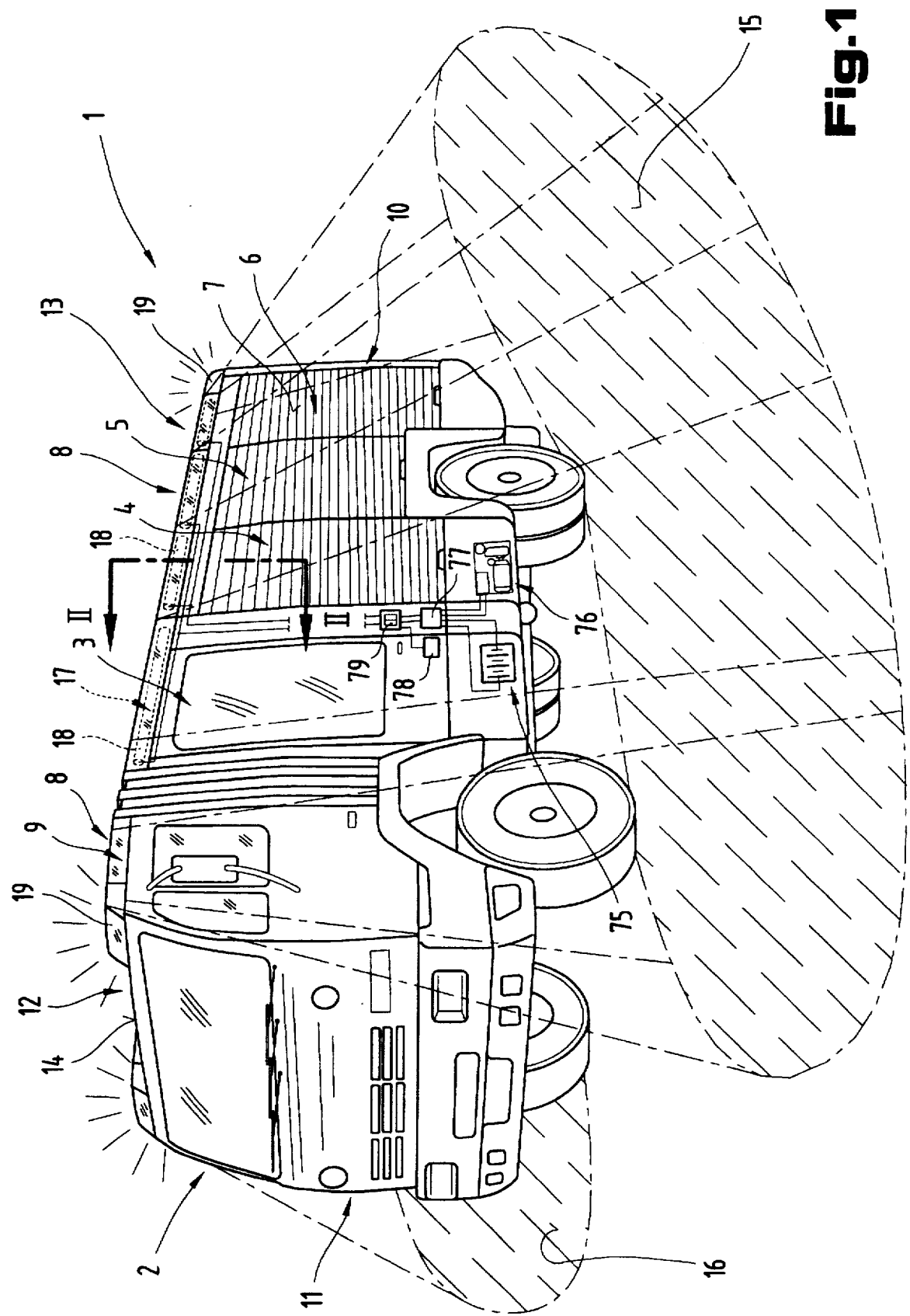
FIG. 1 illustrates an operations vehicle with a lighting device according to the invention in a simplified diagrammatic view.

In FIG. 1 is shown an operations vehicle 1, for example a fire engine, which in the present case is formed by a driver's cabin 2, a crew cabin 3 and equipment boxes 4, 5, and 6. These equipment boxes 4 to 6 are accessible via roller shutters 7, for example.

The operations vehicle 1 is further equipped with a lighting device 8. This lighting device 8 is arranged in a transition region 9 between side panels 10, 11 and a roof 12. The lighting device 8 is constructed as a dropside-like boundary element 13 and placed on a roof surface 14. As can further be seen in FIG. 1, the lighting device 8 is constructed in such a way that a working area 15, 16—shown as a shaded area—is sufficiently illuminated in case of operations in the dark. Due to this extensive exterior lighting around the operations vehicle 1, the risk of an accident is considerably reduced, especially when the operations forces leave the crew cabin 3.

Because the lighting device 8 extends over a large proportion of the vehicle length, sufficient lighting in the region of the equipment boxes 4 to 6 is ensured as well. The arrangement of the lighting device 8 over a larger area, as well as the use of several dazzle-free light sources 17, for example fluorescent tubes 18, considerably reduces shadow formation, especially when compared with a single light source such as a spotlight attached to an extended mast. This allows, particularly in the case of night operations, easier and, more important, safe handling when the operations forces unload the items of equipment from the equipment boxes 4 to 6.

The arrangement of the fluorescent tubes 18 runs parallel to the longitudinal direction of the boundary element 13. The integrated and rigid arrangement of the lighting device 8 in the gallery part or in the transition region 9 of the operations vehicle renders it possible to switch on the lighting immediately before stopping the operations vehicle I at the location of operations. The timing of such deployment allows the operations forces to leave the operations vehicle 1 safely, as the surrounding area is already illuminated accordingly. Hence a significant gain of time is also ensured, because due to the already illuminated working area 15, 16, the operations forces can begin immediately with the necessary activities for the operation, without waiting for the extension of a lighting mast which for safety reasons cannot take place until after the vehicle has stopped.

Like the lighting device 8 for the working area 15, 16, rotating warning lamps 19 can be integrated in the boundary element 13. Due to this closed construction of the lighting device 8 as well as of the warning lamps 19, there are no unnecessarily projecting parts on the operations vehicle 1. This arrangement increases driving safety, especially if branches hanging low hinder the approach to the location of operations.

Figure 2:
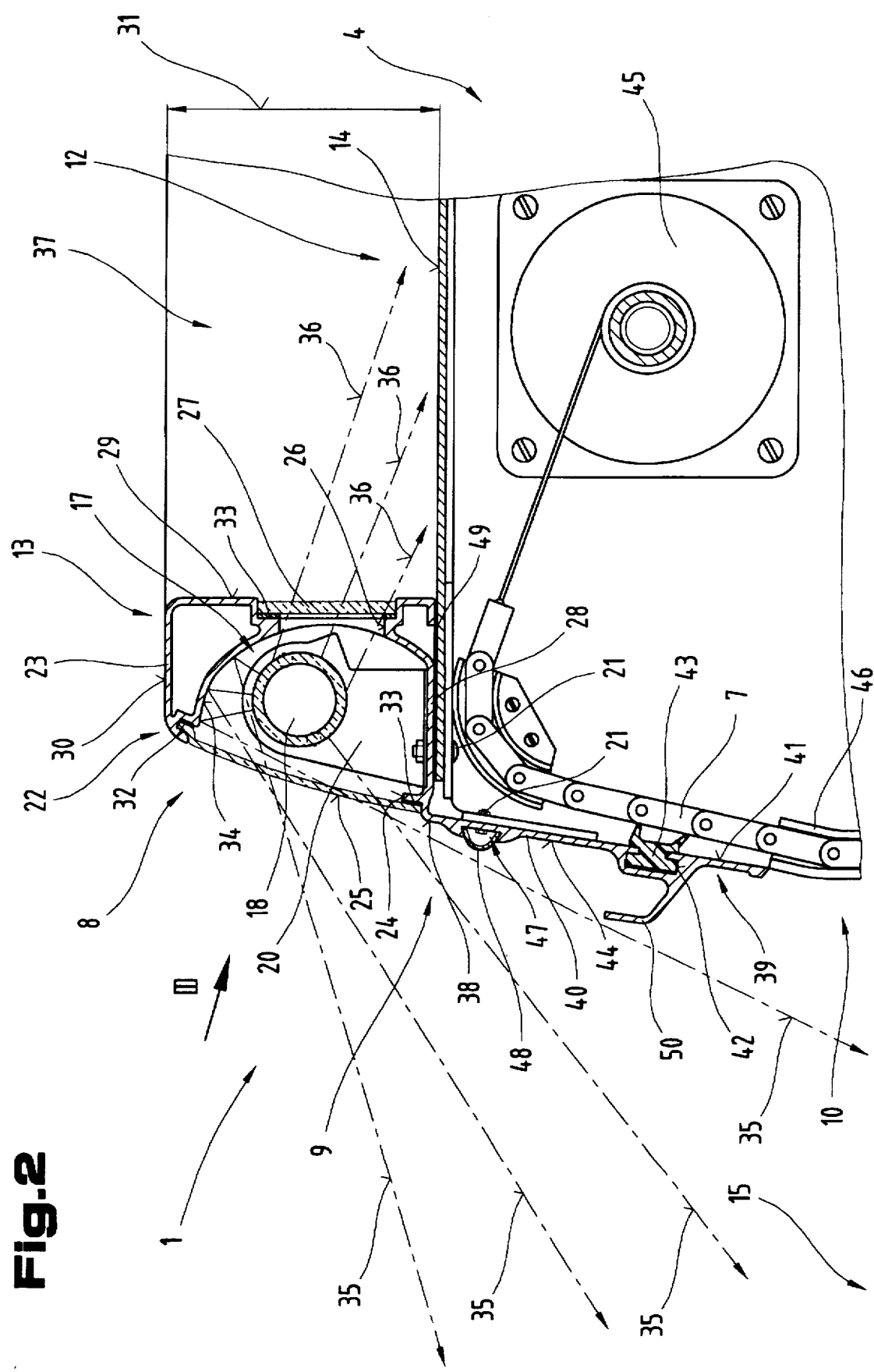
FIG. 2 illustrates part of the operations vehicle in the region of the lighting device in an end view, in section, along lines II—II in FIG. 1.

In FIG. 2 is shown the construction of the lighting device 8 of an operations vehicle 1 in the region of the equipment box 4. A light source 17, for example a dazzle-free fluorescent tube 18, is mounted by a lamp base 20 and fixing elements 21 in a lining 22 of the boundary element 13. The boundary element 13 is formed by a profile 23, for example an aluminum profile drawn in one piece, and has a more or less L-shaped or C-shaped cross-section.

The lining 22 includes the profile 23 which, in the direction of the side panel 10, 11, has an opening 24 for passage of light, and is sealed with a light-transmitting lining panel 25. If desired, in the direction facing away from lining panel 25, an additional opening 26 for passage of light may be arranged which is also sealed with a lining panel 27.

A first arm 28 of the profile 23 rests on the roof surface 14. A second arm 29 of the profile 23 is arranged at an angle to the roof surface 14 and projects beyond the latter. Another arm 30 forms the upper end of the boundary element 13 and is arranged more or less parallel to the first arm 28 at a distance 31 therefrom. Between the arms 28, 30 facing away from each other and pointing in the direction of the side panel 10 is arranged the light-transmitting lining panel 25 made, for example, of Plexiglass.

The lining panel 25 may be highly curved and supported only by the two arms 28, 29 which are arranged at an angle to each other. The lining panel 25 can be, as shown in the upper region of FIG. 2, inserted in the profile 23 together with a seal r 32 or, as shown in the lower region, rigidly connected to the profile 23 by an adhesive layer 33 or by bolting.

The profile 23 is constructed in such a way that openings 26 for passage of light can be formed at any intervals in the region of the arm 29. The light source 17 can also be protected by light transmitting lining panels 27, which are attached to the profile 23 by adhesive layers 33, against external influences, in particular against splashing water which may possibly enter.

The inner side of the profile 23 is constructed as a reflector surface 34, for example as a polished aluminum reflector. As a result, the light of the fluorescent tube 18 is directed directly or indirectly via the reflector surface 34 in the direction of the working area 15, 16, as shown in simplified form by light beams 35, without dazzling or blinding.

Part of the light of the fluorescent tube 18 penetrates directly through the openings 26 for passage of light onto the roof surface 14, as shown in simplified form by light beams 36, and so illuminates a roof region 37. This is necessary in so far as usually further tools and items of equipment are mounted on the roof 12. Due to this illumination of the roof region 37, safe walking is ensured and hence sources of accidents are to a large extent eliminated.

The openings 26 for passage of light are significantly smaller than the openings 24 for passage of light, in order not to reduce the reflector surface 34 too much and not to branch an unnecessary amount of light for illumination of the roof region 37 away from illumination of the working areas 15, 16. The different crosssectional areas of the openings 24, 26 for passage of light permit control of the respective illumination or the degree of brightness in the different regions of the operations vehicle 1.

Connected, preferably integrally, to an end face 38 of the first arm 28 of the boundary element 13 facing away from the second arm 29, is a strip-like or L-shaped profile 39 as an arm 40 which projects from the roof surface 14 in the direction of the side panel 10, 11. This arm 40 has a holding groove 42 for a sealing profile 43 on an inner surface 41 facing towards the openings 26 for passage of light for the roof surface 14. This sealing profile 43, which extends continuously in the longitudinal direction of the profile, serves in particular for sealing between the roller shutter 7 and the strip-like profile 39 and is arranged on the inner surface 41 facing away from an outer surface 44.

The roller shutter 7 is moved up and down in guide strips 46 by a mounting and drive device 45. The guide strips 46 serve simultaneously to position the roller shutter 7 relative to the sealing profile 43.

The strip-like profile 39 further has a recess 47 extending in the longitudinal direction of the profile. This recess 47 serves in particular to receive fixing elements 21 as well as a trim strip 48 for covering these fixing elements 21. As a result, it is relatively easy to fix the boundary element 13 in the region 9 of the equipment boxes 4 to 6 and, thus, in the case of vehicle bodies of self-supporting or cantilever design, to reinforce the corner junction between the roof 12 and the side panels 10, 11.

For better sealing of the interior of the equipment boxes 4 to 6, in addition to the sealing profile 43, a seal 49 can be provided in the transition region 9 between the roof surface 14 and the boundary element 13 or the first arms 28 thereof. On the outer surface 44 of the arm 40 of the L-shaped profile 39 running parallel to the side panel 10, 11, a gutter 50 running in the longitudinal direction of the profile may be fixed or formed integrally with this arm 40. The arrangement of these additional components reinforces the boundary element 13, without incurring greater expenditure.

Figure 3:
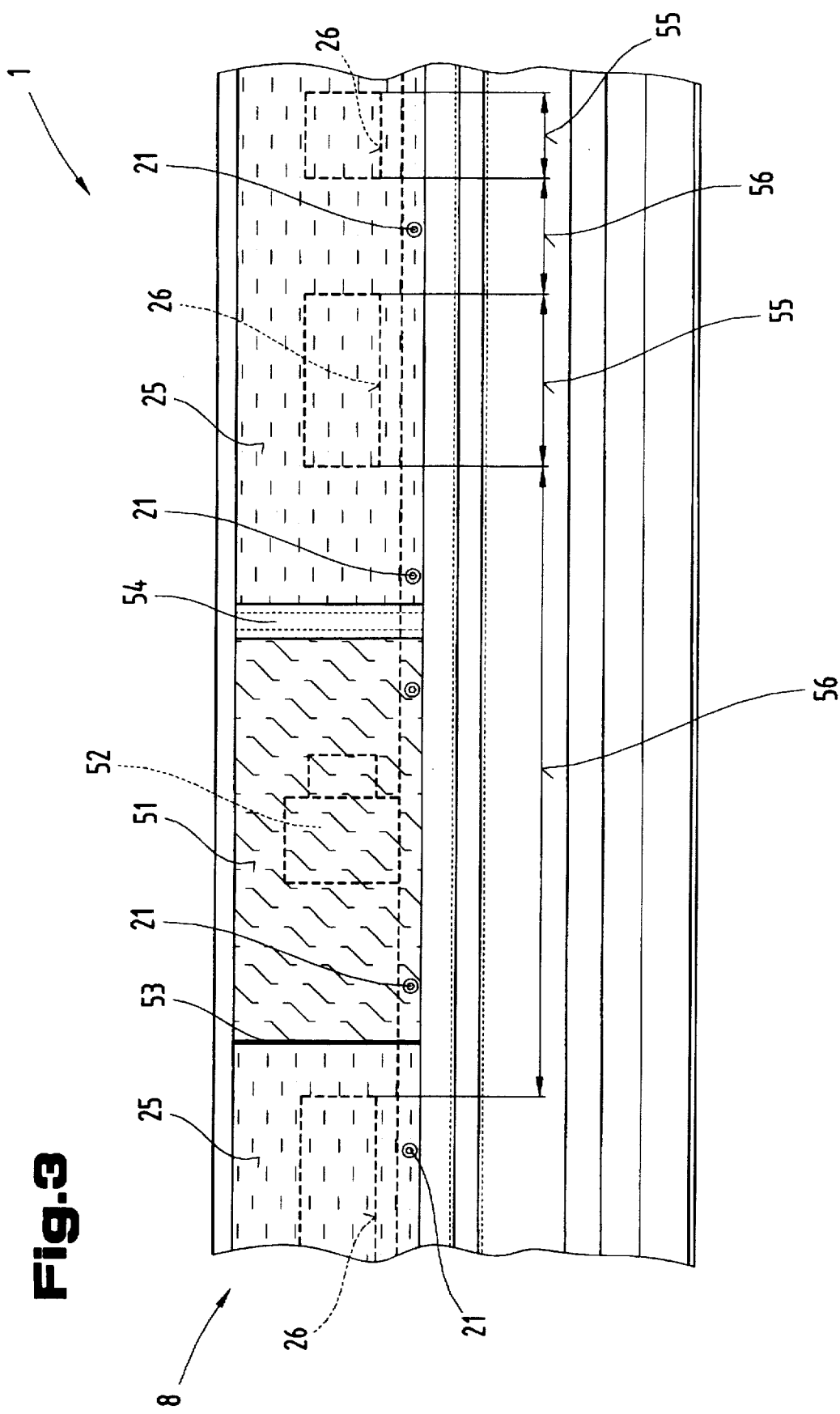
FIG. 3 illustrates part of the lighting device in a side view, along arrow III in FIG. 2.

In FIG. 3 is shown part of the lighting device 8 of the operations vehicle 1 with different lining panels 25, 51 divided in the longitudinal direction. As illustrated in FIG. 3, an opaque lining panel 51 is arranged for example between two transparent, in particular also colored, lining panels 25. It is also possible to combine the lining panels 25, 51 with each other in any number and size. This results in the possibility of covering parts of the light source 17, such as control devices 52 or various switching devices, for example, with matte opaque lining panels 51.

It is particularly important to achieve a liquid-tight connection between the individual lining panels 25, 51, in order to protect not only the light sources 17, but also the associated control devices 52, from splashing and also rain water. This liquid-tight connection of the individual lining panels 25, 51 to each other can be obtained by an adhesive layer 53. To ensure accessibility, however, for example for changing the fluorescent tubes 18, the liquid-tight connection can be made by a fitted sealing strip 54. Exact fixing of the lining panels 25, 51 can also be obtained by fixing elements 21.

Further it can be seen in FIG. 3 that the openings 26 for passage of light can have any length 55 and be arranged at different distances 56 from each other. Due to this freely selectable arrangement of the openings 26 for passage of light, it is possible to protect important roof regions by selective lighting.

Figure 4:
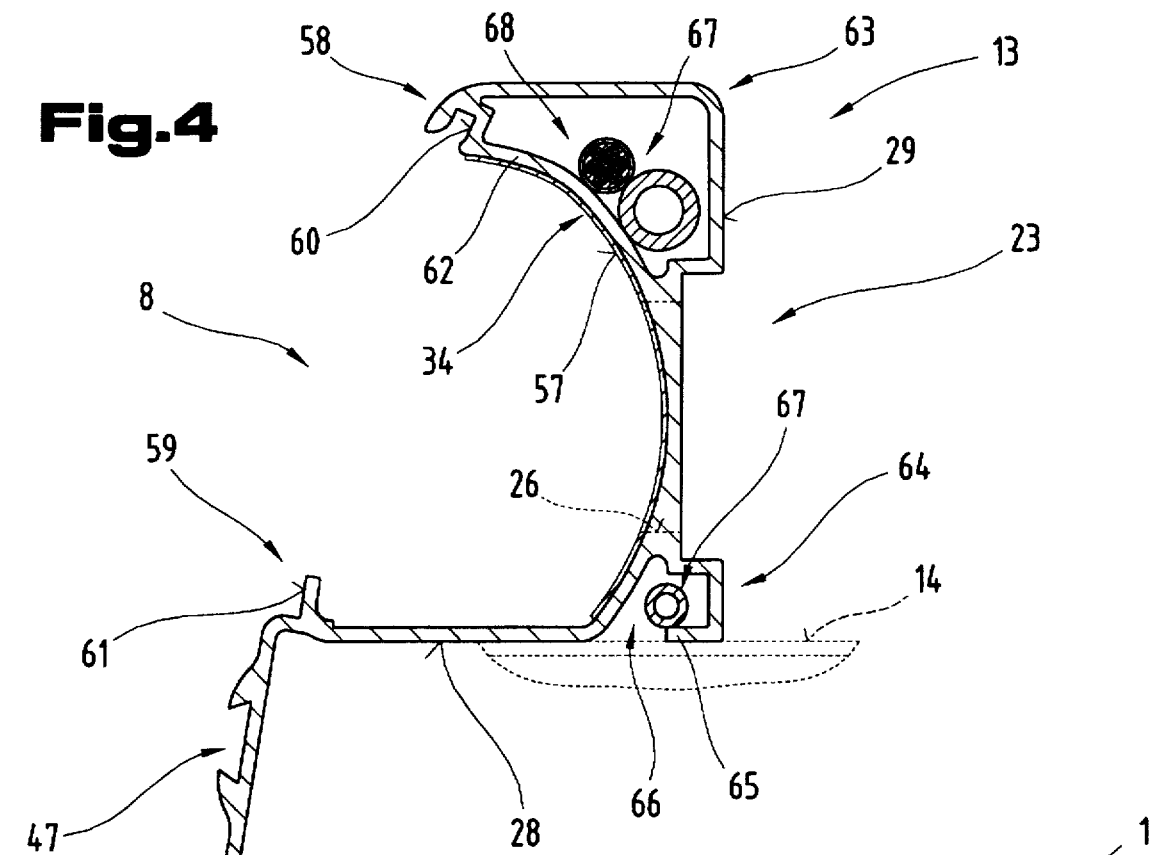
FIG. 4 illustrates the profile of the lighting device according to the invention in an enlarged end view, in section.

In FIG. 4 the profile 23 of the boundary element 13 of the lighting device 8 according to the invention is shown in an end view, in section and on a larger scale. The reflector surface 34 on the inside of the profile 23 is provided with a light-reflecting coating 57, e.g., a coat of paint, a film or the like. It is easier and sufficient, however, to polish the reflector surface 34 and thus also obtain sufficient light to illuminate the working areas 15, 16.

The profile 23 is made without openings 26 for passage of light in the region of the second arm 29. As a result, the arrangement and size of the openings 26 for passage of light can be selected in any size and thus easily adjusted or adapted to the most varied kinds of operations vehicles 1. The profile 23 has, in end regions 58, 59 of the two arms 28, 29 facing away from each other, groove-like recesses 60 or stop strips 61 for receiving or supporting and simultaneously guiding the lining panels 25, 51. As a result, the lining panels 25, 51, can be fixed easily and exactly.

The second arm 29 of the profile 23 has a C-shaped cross-section, wherein part of the cross-section of this arm 29 forms a boundary wall 62 of a hollow profile portion 63. Further formed integrally with the second arm 29 is a support web 64 which has a U-shaped cross-section opening in the direction of the first arm 28. The support web 64 has an arm 65 which is arranged parallel to, in particular aligned with, the first arm 28 of the profile 23. This arm 65 of the support web 64 serves on the one hand to support the profile 23 on the roof surface 14—shown in broken lines—as well as on the other hand in connection with the roof surface 14 to form a cable duct 66. The cable duct 66 serves to receive supply or control lines 67 for energy and pressure media. Similarly, it is also possible to construct the hollow profile portion 63 as a cable duct 68 and to accommodate further supply or control lines 67 therein. This arrangement of the cable ducts 66, 68 in the profile 23 offers a space-saving solution for accommodating the supply or control lines 67.

The various possibilities for providing recesses 47, a holding groove 42 as well as a gutter 50 in the region of the strip-like profile 39 have already been described in more detail in connection with FIG. 3.

Figure 5:
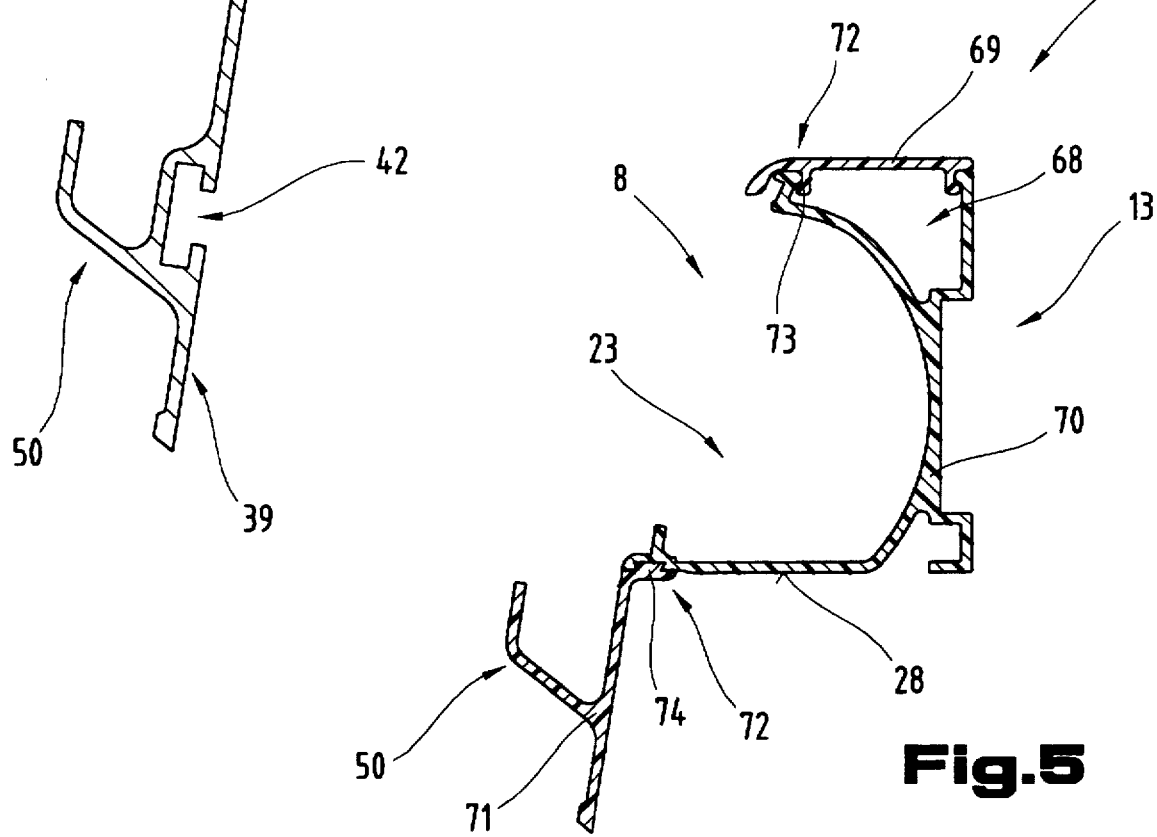
FIG. 5 illustrates a variant of the profile for the lighting device according to the invention in an enlarged end view, in section.

In FIG. 5 is shown a variant of the profile 23 for the lighting device 8 of the boundary element 13 of an operations vehicle 1. The boundary element 13 is in this case made of plastic, in particular glass fiber-reinforced plastic or a thermosetting plastic or a thermoplastic material and consists of several profile portions 69, 70, and 71. This arrangement of several individual profile portions connected by coupling devices 72, e.g., snap connections 73, guide strips 74 or the like, renders it possible to make a boundary element 13 for the most varied applications in a simple and relatively inexpensive manner. For example, a profile portion 71 which is constructed as a gutter 50 can be attached to the first arm 28 of the profile 23 directly by the guide strip 74. Furthermore, a cable duct 68 can be covered with a profile portion 69 which is provided with a coupling device 72 constructed as a snap connection 73.

As can further be seen in FIG. 1, there is the possibility of operating the lighting device 8 selectively at low voltage, e.g., at 12 or 24 volts, or at normal voltage, for example between 110 or 250 volts a.c. voltage. In a simplified view, FIG. 1 shows that the low voltage or d.c. voltage is supplied by a battery 75 and the normal voltage or a.c. voltage by a power unit 76. A switching device 77 allows selective switching between the battery 75 and the power unit 76.

Similarly, an additional energy-storing device 78 can be arranged in the operations vehicle 1 in order to operate the lighting device 8 as emergency lighting at least for a given period of time. In order to be able to operate the lighting device 8 in an energy-saving manner over a longer period of time, the light sources 17 or the individual fluorescent tubes 18 can be connected to each other in groups. Thus, for example, during a longer period of time in which there is no removal of items of equipment from the equipment boxes 4 to 6, every other fluorescent tube 18 can be switched off by an additional switching device 79. In addition, movement indicators can also be used to switch the reduced lighting fully automatically to full lighting when the operations forces approach the operations vehicle 1. Due to these auxiliary devices, energy can easily be saved without neglecting the safety of operations forces in the process.

Finally, it is pointed out that, for a better understanding of the invention, individual parts and components are shown distorted out of proportion and out of scale in the drawing.

We claim:

1. An operations vehicle illuminating a working area and comprising:
   (a) a side panel;
   (b) a roof;
   (c) a transition region between the side panel and the roof; and
   (d) a lighting device disposed in the transition region and on the roof, the lighting device including:

a light source, and a lining enclosing the light source, having a light opening in a direction of the side panel directing light from the light source onto the working area, and having a plurality of light apertures facing the roof and directing light from the light source onto the roof.

2. The operations vehicle according to claim 1 wherein the light source is a fluorescent tube.

3. The operations vehicle according to claim 2 wherein the fluorescent tube extends parallel to the longitudinal direction of the lighting device.

4. The operations vehicle according to claim 1 wherein the lighting device has a cross section substantially one of an L-shape and a C-shape and the lining of the lighting device has a first arm resting on the roof, a second arm projecting at an angle to and beyond the roof, and a light-transmitting lining panel arranged between the first arm and the second arm.

5. The operations vehicle according to claim 4 wherein the light apertures are arranged in the second arm.

6. The operations vehicle according to claim 4 wherein the first arm has an end face, the operations vehicle further comprising a substantially L-shaped profile connected to the end face and projecting from the roof in the direction of the side panel.

7. The operations vehicle according to claim 6 wherein the substantially L-shaped profile is parallel to the side panel and has an inner surface facing towards the light apertures and a groove disposed in the inner surface, the operations vehicle further comprising a roller shutter extending substantially continuously in the longitudinal direction of the substantially L-shaped profile and a sealing profile held in the groove of the substantially L-shaped profile and disposed in the area between the rolling shutter and the substantially L-shaped profile.

8. The operations vehicle according to claim 6 further comprising a trim strip and means for fixing the substantially L-shaped profile to the operations vehicle, wherein the substantially L-shaped profile has an outer surface with a recess disposed in the outer surface extending in the longitudinal direction of the substantially L-shaped profile, at least one of the fixing means and the trim strip disposed in the recess of the outer surface of the substantially L-shaped profile.

9. The operations vehicle according to claim 8 further comprising a gutter disposed on the outer surface of the substantially L-shaped profile and extending in the longitudinal direction of the substantially L-shaped profile.

10. The operations vehicle according to claim 4 wherein the second arm has a substantially C-shaped cross-section forming a boundary wall of a hollow profile portion.

11. The operations vehicle according to claim 10 wherein the second arm has a side facing away from the first arm, the operations vehicle further comprising (a) a support web integrally formed in the side of the second arm and projecting beyond the first arm, and (b) means for supplying at least one of energy and pressure media disposed in at least one of the hollow profile portion and the support web.

12. The operations vehicle according to claim 4 wherein the second arm has a side facing away from the first arm, the operations vehicle further comprising a support web integrally formed in the side of the second arm and projecting beyond the first arm.

13. The operations vehicle according to claim 12 wherein the support web has a substantially U-shaped cross-section opening in the direction of the first arm.

14. The operations vehicle according to claim 12 wherein the support web has a first arm and a second arm, the first arm of the support web integrally formed with the second arm of the lining of the lighting device and the second arm of the support web extending parallel to the first arm of the support web and extending parallel to and in alignment with the first arm of the lining of the lighting device.

15. The operations vehicle according to claim 4 wherein the second arm has a light-reflective surface facing towards the light source.

16. The operations vehicle according to claim 15 wherein the light-reflective surface has a light-reflecting coating.

17. The operations vehicle according to claim 4 wherein the first arm has a first end region with one of a groove and a stop strip and the second arm has a second end region facing away from the first end region with the other of the groove and the stop strip, the groove and the stop strip guiding the lining panel.

18. The operations vehicle according to claim 1 wherein the cross-sectional area of the light apertures is significantly smaller than the cross-sectional area of the light opening.

19. The operations vehicle according to claim 1 wherein the plurality of light apertures are arranged at preset distances from each other.

20. The operations vehicle according to claim 1 further comprising a lamp base supporting the light source of the lighting device.

21. The operations vehicle according to claim 1 further comprising at least two power sources and means for connecting the light source both separately and concurrently to each of the at least two power sources.

22. The operations vehicle according to claim 1 further comprising an energy storing device, wherein the light source is connected to the energy storing device.

23. The operations vehicle according to claim 1 further comprising a plurality of light sources successively arranged along the longitudinal direction of the lighting device and a plurality of energy sources, each of the plurality of light sources connected to a different one of the plurality of energy sources.

24. The operations vehicle according to claim 1 further comprising a first light-transmitting lining panel sealing the plurality of light apertures and a second light-transmitting lining panel sealing the light opening.

25. The operations vehicle according to claim 1 further comprising a plurality of light-transmitting lining panels disposed in the lining of the lighting device and a plurality of opaque lining panels disposed in the lining of the lighting device, the opaque lining panels arranged alternately between the light-transmitting lining panels.

26. The operations vehicle according to claim 25 further comprising means for connecting the individual light-transmitting lining panels to the individual opaque lining panels in a liquid-tight manner.

27. The operations vehicle according to claim 1 wherein the lighting device has a boundary element formed from a material selected from the group consisting of glass fiber-reinforced plastics, thermosetting plastics, and thermoplastics.

28. The operations vehicle according to claim 1 wherein the lighting device has a boundary element composed of several individual profile portions connected by coupling devices.

29. The operations vehicle according to claim 1 wherein the lighting device has a boundary element formed from aluminum drawn in one piece.

* * * * *